No. 679,395. Patented July 30, 1901.
W. PARKS.
STRAWBERRY RUNNER CUTTER.
(Application filed May 24, 1901.)
(No Model.)

Witnesses
C. H. Woodward
J. W. Garner

William Parks, Inventor,
By C. A. Snow & Co.
Attorneys

THE NORRIS PETERS CO., PHOTO-LITHO., WASHINGTON, D. C.

United States Patent Office.

WILLIAM PARKS, OF CRAWFORD, COLORADO.

STRAWBERRY-RUNNER CUTTER.

SPECIFICATION forming part of Letters Patent No. 679,395, dated July 30, 1901.

Application filed May 24, 1901. Serial No. 61,774. (No model.)

*To all whom it may concern:*

Be it known that I, WILLIAM PARKS, a citizen of the United States, residing at Crawford, in the county of Delta and State of Colorado, have invented a new and useful Strawberry-Runner Cutter Attachment for Cultivators, of which the following is a specification.

My invention is an improved attachment for cultivators adapted for use in cutting off lateral strawberry-runners when cultivating the rows of plants; and it consists in the peculiar construction and combination of devices hereinafter fully set forth and claimed.

Figure 1:
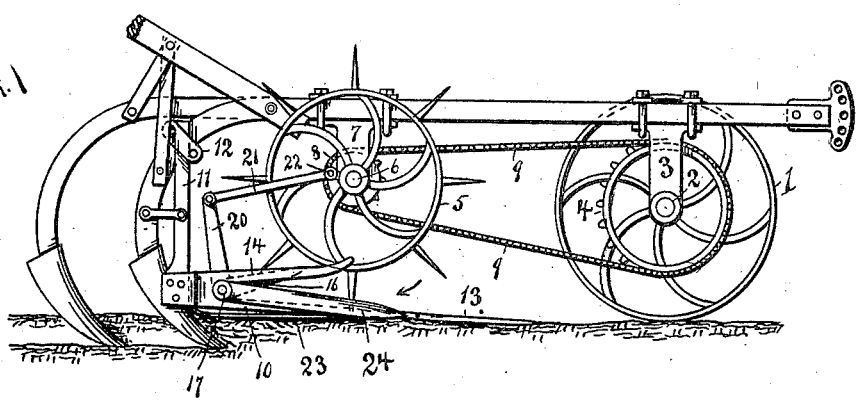
Figure 2:
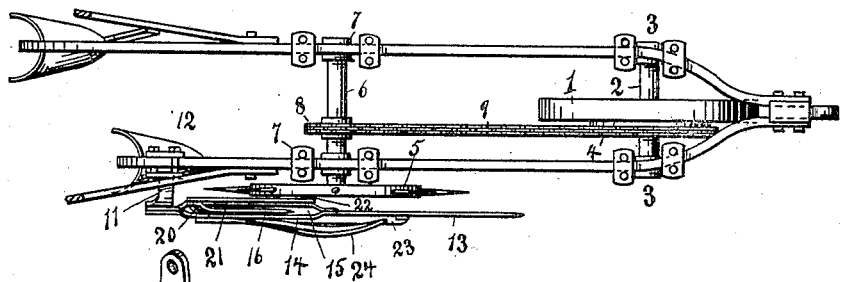
Figure 3:
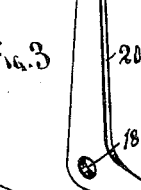
Figure 4:
Figure 5:
Figure 6:
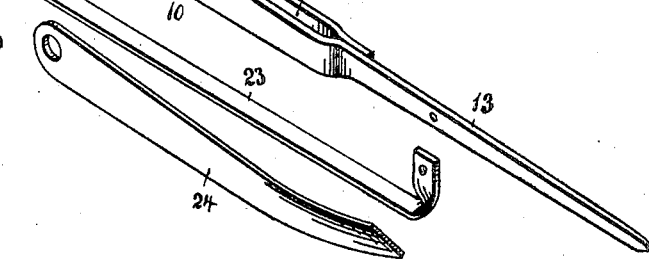

In the accompanying drawings, Figure 1 is a side elevation of a cultivator of usual form provided with a strawberry-runner cutter attachment constructed in accordance with my invention. Fig. 2 is a top plan view of the same. Fig. 3 is a detail perspective view of the oscillating cutting-knife. Fig. 4 is a similar view of the shear. Fig. 5 is a similar view of the runner for the heel of the shear. Fig. 6 is a similar view of the fender.

In the embodiment of my invention I provide a traction-wheel 1 on an axle-shaft 2, which is journaled in bearings 3, that may be attached to and readily detached from the beams of a cultivator of usual form. A sprocket-wheel 4 revolves with the wheel 1. A sweep-wheel 5, which may be either of the form here shown or any other suitable form, is on one end of a shaft 6, which shaft is journaled in bearings 7, that may be attached to or detached from the beams of the cultivator. The sweep-wheel 5 operates on one side of the cultivator, as shown in Figs. 1 and 2. A sprocket-wheel 8 is attached to shaft 6 and is connected to sprocket-wheel 4 of shaft 2 by an endless sprocket-chain 9. Thereby power is conveyed from the traction-wheel 1 to the sweep-wheel 5, and the lower side of the latter moves rearwardly, as is indicated by the arrow in Fig. 1. A shear 10 has at its rear end a standard 11, which may be attached to one of the beams of the cultivator, a clip-bolt 12 being here shown for this purpose; but any other suitable means may be employed in lieu of the clip-bolt, if preferred.

The shear 10 is bifurcated and comprises the lower finger 13 and the upper finger 14. The lower finger 13 is extended forward a considerable distance, and its front end is adapted to run under the lateral runners of the strawberry-plants and raise the same.

The fingers 13 14 converge rearwardly, as shown, and the proximate portions thereof are provided with vertical alined slots 15. An oscillating knife 16 operates in the slots 15 and between the fingers 13 and 14, the latter acting as ledger-plates. The said knife 16 is fulcrumed on a bolt 17, which passes through alined openings 18 19, with which the knife and the shear 10 are respectively provided. The said knife has an upward-extending arm 20, which is connected by a pitman 21 to a crank-pin 22, with which the sweep-wheel 5 is provided. Thereby oscillating motion is imparted to the knife. A runner 23 is secured under the shear 10. A fender 24 is disposed on the outer side of the shear, and the rear end thereof in the form of my invention here shown is secured on the bolt 17. The said fender prevents trash from getting to the knife.

The action of the sweep-wheel 5 is such as to gather the runners and convey the same to the cutting mechanism. The fender 24 not only prevents trash from getting to the knife, but also serves to protect the leaves of the plants in the rows.

Having thus described my invention, I claim—

1. In a strawberry-runner cutter, the combination of a sweep-wheel, a shear having lower and upper rearwardly-converging fingers provided with vertical slots, an oscillating knife operating in said slots and between said fingers, and a pitman connecting said oscillating knife to said sweep-wheel, substantially as described.

2. In a strawberry-runner cutter, the combination with a sweep-wheel and means to rotate the same, of a shear having lower and upper rearwardly-converging fingers provided with vertical slots, a runner under the said shear at the heel thereof, a fender on the outer side of the shear, an oscillating knife operating in the slots of said shear and between the fingers thereof, and a pitman connecting said oscillating knife to said sweep-wheel, substantially as described.

In testimony that I claim the foregoing as my own I have hereto affixed my signature in the presence of two witnesses.

WILLIAM PARKS.

Witnesses:
SADA B. ZIMMERMAN,
E. S. PARKER.